(12) United States Patent
Steinbrecher

(10) Patent No.: US 7,504,905 B1
(45) Date of Patent: Mar. 17, 2009

(54) METHOD FOR COUPLING A DIRECT CURRENT POWER SOURCE ACROSS A DIELECTRIC MEMBRANE OR OTHER NON-CONDUCTING MEMBRANE

(75) Inventor: Donald H. Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/022,506

(22) Filed: Jan. 30, 2008

(51) Int. Cl.
*H01P 5/00* (2006.01)
*H02J 1/00* (2006.01)
*H02M 3/22* (2006.01)

(52) U.S. Cl. .................... 333/24 C; 333/260
(58) Field of Classification Search ........... 333/24 C, 333/24 R, 172, 177, 181, 260; 363/15, 64
See application file for complete search history.

(56) References Cited

U.S. PATENT DOCUMENTS

| | | | |
|---|---|---|---|
| 2,597,054 A * | 5/1952 | Barthelemy | 315/30 |
| 4,339,668 A | 7/1982 | Mueller et al. | |
| 5,057,847 A | 10/1991 | Vaisanen | |
| 5,091,837 A * | 2/1992 | Duspiva et al. | 363/15 |
| 5,212,492 A | 5/1993 | Jesman et al. | |
| 5,278,572 A | 1/1994 | Harada et al. | |
| 5,612,652 A | 3/1997 | Crosby | |
| 5,737,163 A * | 4/1998 | Newlin | 361/18 |
| 5,841,646 A * | 11/1998 | Cornec | 363/56.08 |
| 5,929,718 A | 7/1999 | Crosby | |

* cited by examiner

*Primary Examiner*—Dean O Takaoka
(74) *Attorney, Agent, or Firm*—James M. Kasischke; Michael P. Stanley; Jean-Paul A. Nasser

(57) ABSTRACT

A method for coupling power across a non-conducting membrane. A generator converts a DC source on a first side of a non-conducting membrane to a square-wave at a determined frequency. The generator output connects to a transformer and onto a first set of capacitor plates on the first side of the membrane. A second set of plates on the second side of the membrane form a set of coupling capacitors wherein the non-conducting dielectric membrane becomes part of the coupling-capacitor dielectric material. The second set of plates connects to a transformer and onto a non-linear circuit that converts the square-wave to DC voltage and current that can power a load such that the power delivered is approximately equal to the power available from the DC source on the first side of the membrane. The coupling capacitors may be replaced by coupled coils with nearly the same power delivery effect.

9 Claims, 15 Drawing Sheets

US 7,504,905 B1

METHOD FOR COUPLING A DIRECT CURRENT POWER SOURCE ACROSS A DIELECTRIC MEMBRANE OR OTHER NON-CONDUCTING MEMBRANE

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention relates to power transmission and more specifically to a method for coupling a direct current power source across a non-conducting membrane.

(2) Description of the Prior Art

Some "smart skin" systems use thousands of electronic sensors located on the external surface of an underwater vehicle in which the sensors maintain surveillance of the surrounding seawater. In some cases, it may be desirable to maintain the integrity of the vehicle skin as an impermeable membrane in that physical conduits to the sensors should not penetrate the membrane. As such, a need exists for a method of powering across a non-conducting membrane in order to provide primary power to the sensors.

SUMMARY OF THE INVENTION

Accordingly, it is a general purpose and primary object of the present invention to provide a method to provide primary power to a system on one side of a protective impermeable membrane that is derived from a power source located on an opposite side of the membrane. For example, to provide power to a system imbedded in a human body wherein the membrane is the human skin enclosing that body.

In order to attain the object described, the method efficiently couples a direct current (DC) power across a barrier (impermeable membrane) using circuits, which are realized with conventional electronic components. Placing parallel plates on opposite sides of the membrane can form coupling capacitors across the membrane.

For example, circular plates with a diameter of four centimeters and separated by a one-millimeter thick dielectric would have a capacitance of about ten pico-Farads multiplied by the relative dielectric constant of the material. A capacitance of this magnitude would support the disclosed method for many applications. As a result, the DC power is transmitted to the electronic circuits without physically penetrating the dielectric skin of the underwater vehicle, transmitting through a capacitive coupling or a magnetic coupling, which bridges the dielectric skin to power the sensors or other electric equipment.

To anyone or to those ordinarily skilled in the art will recognize that the method of the present application can also be realized by a dual method wherein a magnetic coupling mechanism is effected by placing coupled coils on topologically opposite sides of a non-magnetic membrane. While this application will focus on capacitive coupling in order to teach the method, the dual magnetically coupled mode is claimed implicitly.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Figure 1:
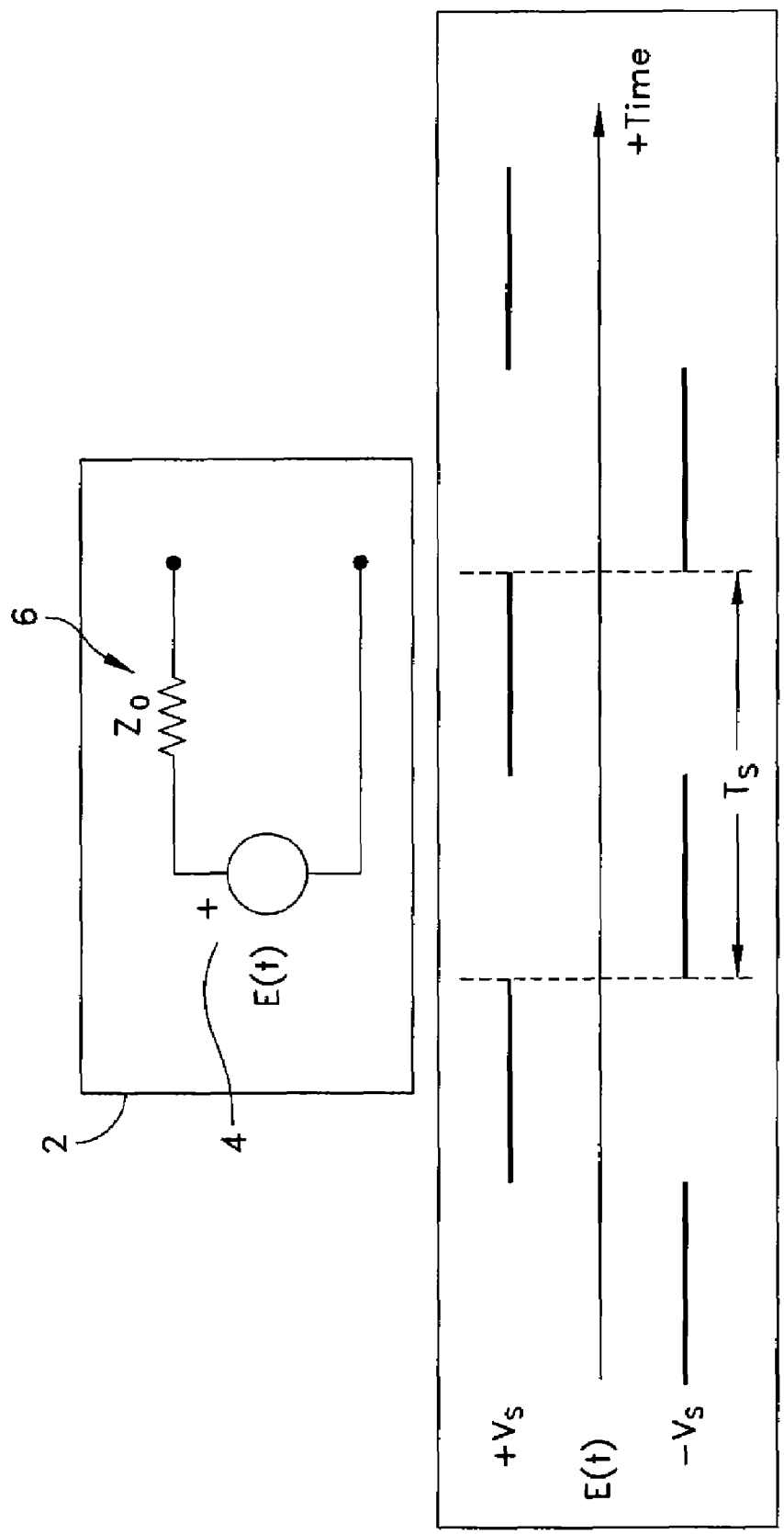
FIG. 1 depicts a Thevenin-Equivalent square-wave source.

A method for transmitting direct current (DC) power over a transmission line is disclosed in which the method uses two circuits. The method provides DC power to loads that have a barrier with respect to a source of the DC power.

The first circuit including a square-wave generator uses the DC power source to generate a square-wave. The generator uses an inductor, a capacitor, and a switch, which can be implemented using a single transistor and a drive circuit. The second circuit, a square-wave converter, converts a square-wave source into a DC source. The converter uses an inductor, a capacitor and a P-N junction diode.

The generator and converter each provide a matched termination to a uniform transmission line so that energy is not reflected from the converter back toward the generator. Thus, the transmission line can be lengthened without affecting the efficiency of power transmission.

The characteristic impedance of a "uniform" transmission line is constant over an entire length of the transmission line. Power will be lost and a voltage drop will occur as a result of transmission line Ohmic losses. Using transmission line transformers to increase voltage and decrease current on the transmission line can reduce these losses.

The transmission efficiency of the disclosed method is determined by departures from ideal parameters of the components used. If the diode, inductor, capacitor, and transmission line were all ideal and loss did not exist, then the transmission efficiency would be one hundred percent.

A small amount of DC power is required to energize the switch driver circuits but the switch driver is located at the DC source where, presumably, DC power is more than sufficient. Therefore, a discussion of the switch driver power is minimized relative to the method of the disclosure. That is, the DC power delivered to the load would be equal to the DC power available from the source.

There is a limit on the amount of power that can be delivered to a load using the disclosed method. The limit is fixed by the non-linear properties of the diode used in the converter circuit. The maximum current that can be delivered to a load is one half of the maximum forward current that the diode can safely carry. The maximum voltage that can be delivered to a load is one half of the breakdown voltage of the diode. The maximum DC power that can be delivered to a load is the product of one-half of the maximum forward current and one half of the breakdown voltage. For example, a diode with a reverse breakdown voltage of 100 Volts may be able to support a maximum forward current of one Ampere. The maximum power that could be delivered to a resistive load by a converter that uses this diode would be 25 Watts (50 Volts× 500 mA).

The disclosed method uses inductors and capacitors as energy storage elements and it is well known that energy is lost when an abrupt change in capacitor voltage or an abrupt change in inductor current is required by a circuit operation. Within the disclosed method and under steady-state operating conditions, inductor current and capacitor voltage remain essentially constant. "Steady-state" operating conditions are the operating conditions under which the circuits would normally be used. When the circuits of the disclosed method are first energized and the switch begins operation; the current through the inductors and the voltage across the capacitors are both zero. A transient state exists until the inductor currents and capacitor voltages become periodically stable. These operating conditions are thus described as "steady-state".

Under most conditions, inductor voltage and capacitor current are each subjected to abrupt changes as the square-wave polarity changes. Even though these abrupt changes are allowable with ideal components, the parasitic capacitance of the inductors and the parasitic inductance of the capacitors degrade the ideal operation of the method and decrease the observed efficiency. In this discussion, these parasitic effects are minimized because, in good-engineering practice, these effects only minimally degrade performance.

In FIG. 1, a Thevenin-Equivalent square-wave source 2 is illustrated. In the figure, a signal generator 4 switches a voltage between a positive value state, $+V_S$ and a negative value state, $-V_S$, which have the same magnitude but opposite polarity. In FIG. 1 and the follow-on figures, E(t) refers to a voltage, E, that is a function of time, t. The time graph below the circuit describes the voltage-time function as a square wave. Thus, E(t) refers to the time-varying voltage illustrated in the bottom half of each figure.

The switching operation is periodic with a period, $T_S$, and with equal dwell times in each state. Thus, the average value of the generator voltage is zero. Furthermore, the time, $T_S$, that is required to switch between the two states, is negligible.

E(t) in each figure refers to a voltage, E, that is a function of time, t. The time graph below the circuit describes the voltage-time function as a square wave. Thus, E(t) refers to the time-varying voltage illustrated in the bottom half of each figure.

The source impedance 6 of the square-wave generator 4 is $Z_0$, a positive real number. In general, a Thevenin-Equivalent source impedance can be complex and may, under certain circumstances, have a negative real part. However, for the purposes of this disclosure, only positive real values of $Z_0$ are considered. This restriction is consistent with almost all practical applications.

If the equivalent circuit were used to drive a transmission line with characteristic impedance also equal to $Z_0$, then the equivalent circuit for the output of the transmission line would be identical to the illustration in FIG. 1, regardless of the length of the transmission line.

Figure 2:
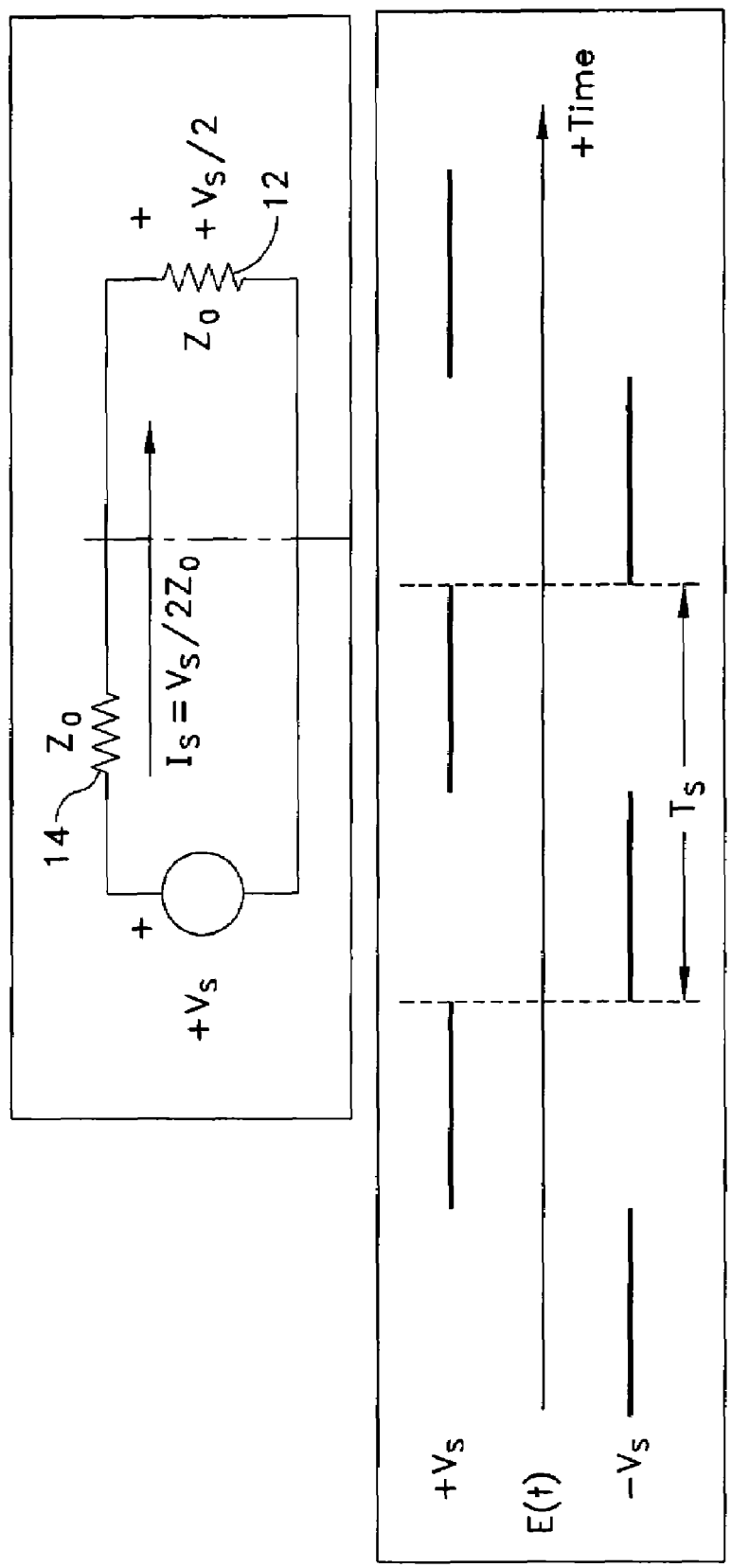
FIG. 2 depicts a loaded square-wave source.

The maximum power available from the Thevenin-Equivalent circuit of FIG. 1 is equal to the power that would be delivered to a load resistor equal to $Z_0$, as illustrated in FIG. 2. In FIG. 2, maximum power transfer occurs when a generator is driving a load that is equal to the source impedance of the generator. A load 12 is $Z_0$, which is equal to a generator impedance 14. Under these conditions, the voltage across the load is one-half voltage of the generator and the current is one half of the short circuit current available from the Thevenin-Equivalent generator.

Figure 3:
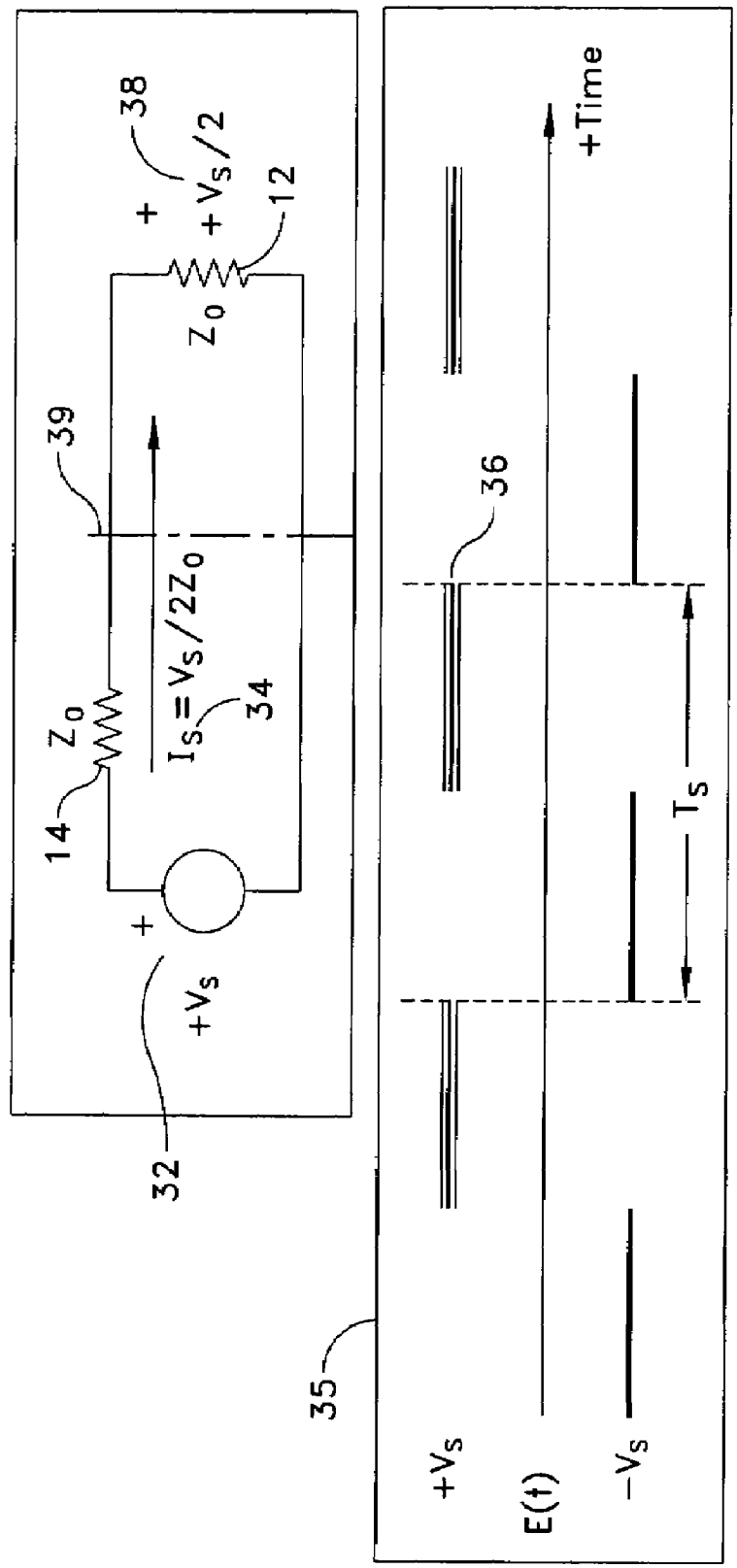
FIG. 3 depicts a square-wave source, positive half period.

During the positive state of a generator 32, illustrated in FIG. 3, a current 34 passing through a load, $Z_0$, is $V_S/2Z_0$ so that the instantaneous power delivered to the load, $Z_0$, is $(V_S)^2/4Z_0$. During a positive half period 36 of the square-wave cycle, the current 34 is positive and equal to the peak voltage, $V_S$, divided by the total circuit resistance $2Z_0$ and a voltage 38 across the load is one-half peak voltage, $V_S$, of the generator 32.

Figure 4:
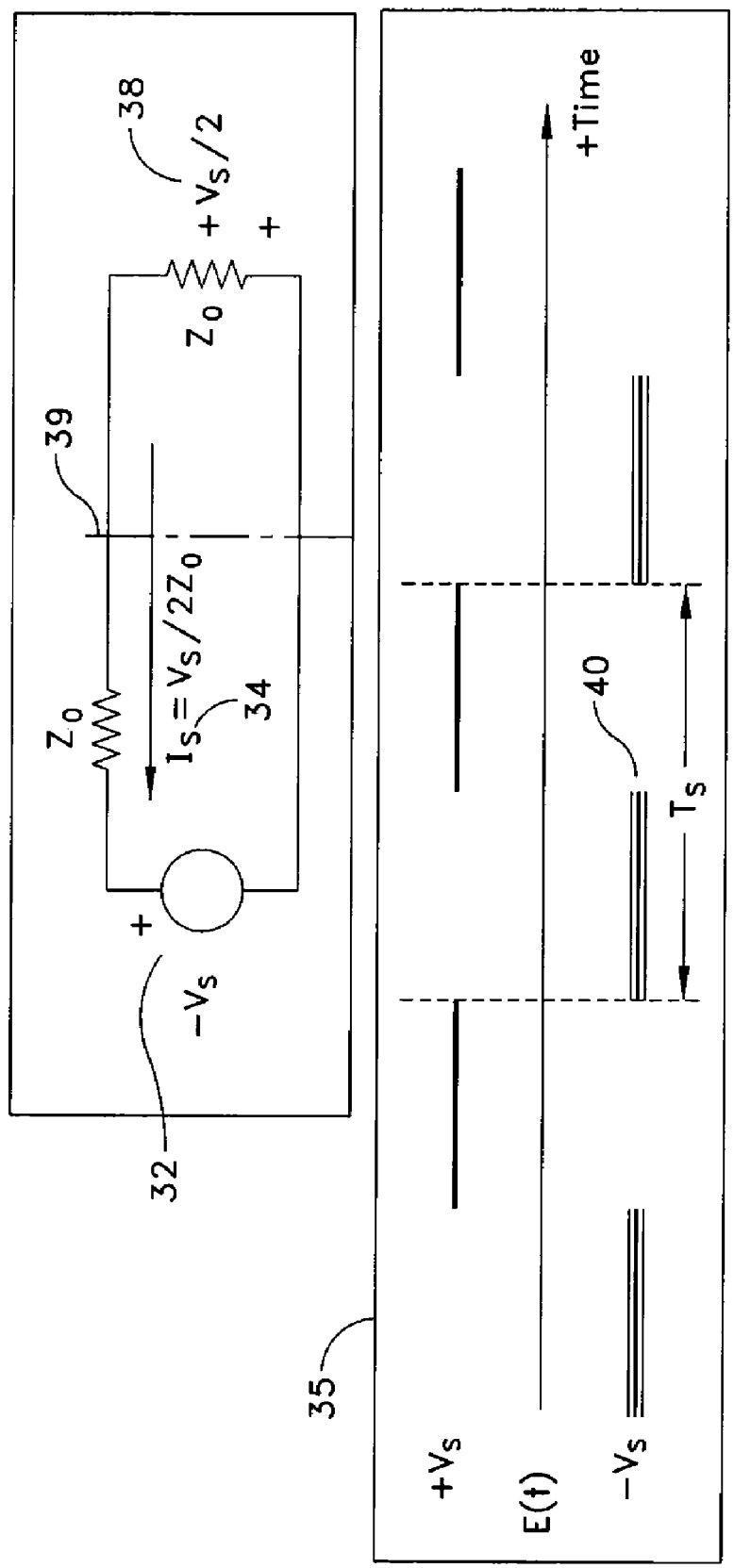
FIG. 4 depicts a square-wave source, negative half period.

During a negative state of the generator 32, illustrated in FIG. 4, the instantaneous power delivered to the load, $Z_0$, is the same, $(V_S)^2/4Z_0$, even though the current 34 flows in the opposite direction. Thus, the average power is equal to the instantaneous power and is defined as $P_{MAX}=(V_S)^2/4Z_0$, which is the maximum power available from the source. During a negative half period 40 of the square-wave cycle, the current 34 is positive and equal to the peak voltage, $V_S$, divided by the total circuit resistance, $2Z_0$ and the voltage 38 across the load is one half of the peak voltage, $V_S$. Thus terminated, the generator is optimally loaded because the generator is delivering a maximum available power to the load, $Z_0$.

Energy Efficient Square-Wave Generator

Figure 5:
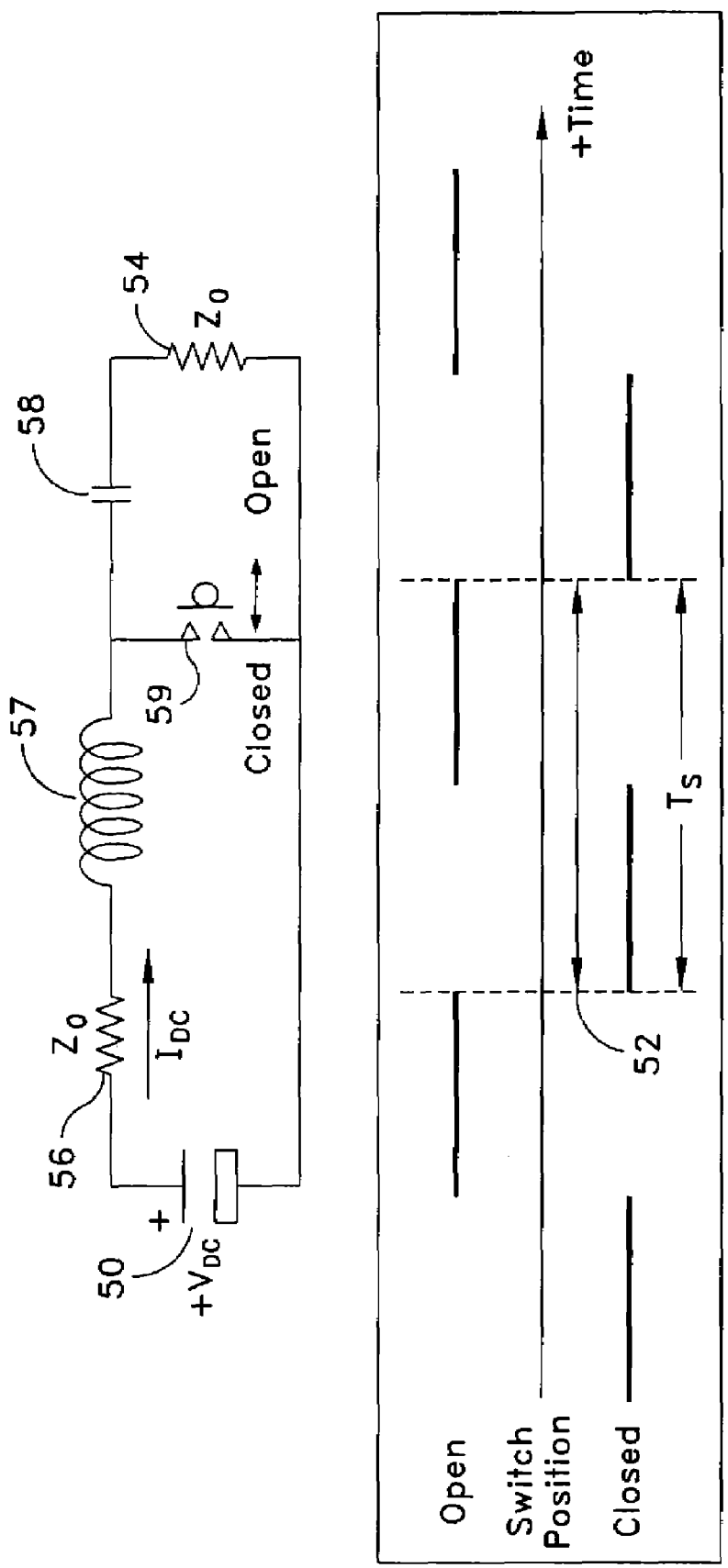
FIG. 5 depicts a square-wave generator.

The circuit illustrated in FIG. 5 can convert a DC source 50 into a square-wave 52 driving a load impedance 54 which is equal to an internal impedance 56 of the DC source. Assuming ideal components, an inductor 57 and a capacitor 58, the efficiency of the conversion is approximately one hundred percent because the average square-wave power delivered to the load impedance 54 is equal to the maximum DC power available from the DC source 50. A square-wave is created by the periodic operation of a switch 59 that changes state once each period, $T_S$. The two states of the switch 59 are defined as follows: (1) when the switch is OPEN, the current through the branch containing the switch is zero while the voltage across the branch can assume any value, and (2) when the switch is CLOSED, the voltage across the branch containing the switch is zero while the current through the branch can assume any value. The dwell time in each of the two switch states is the same.

The switch 59 opens and closes periodically causing a square-wave of current to pass through the load resistor, $Z_0$. A transient state occurs when the action of the switch 59 is first initialized. The transient state lasts until the voltage across the capacitor 58 and the current through the inductor 57 each reach a steady-state condition.

Figure 6:
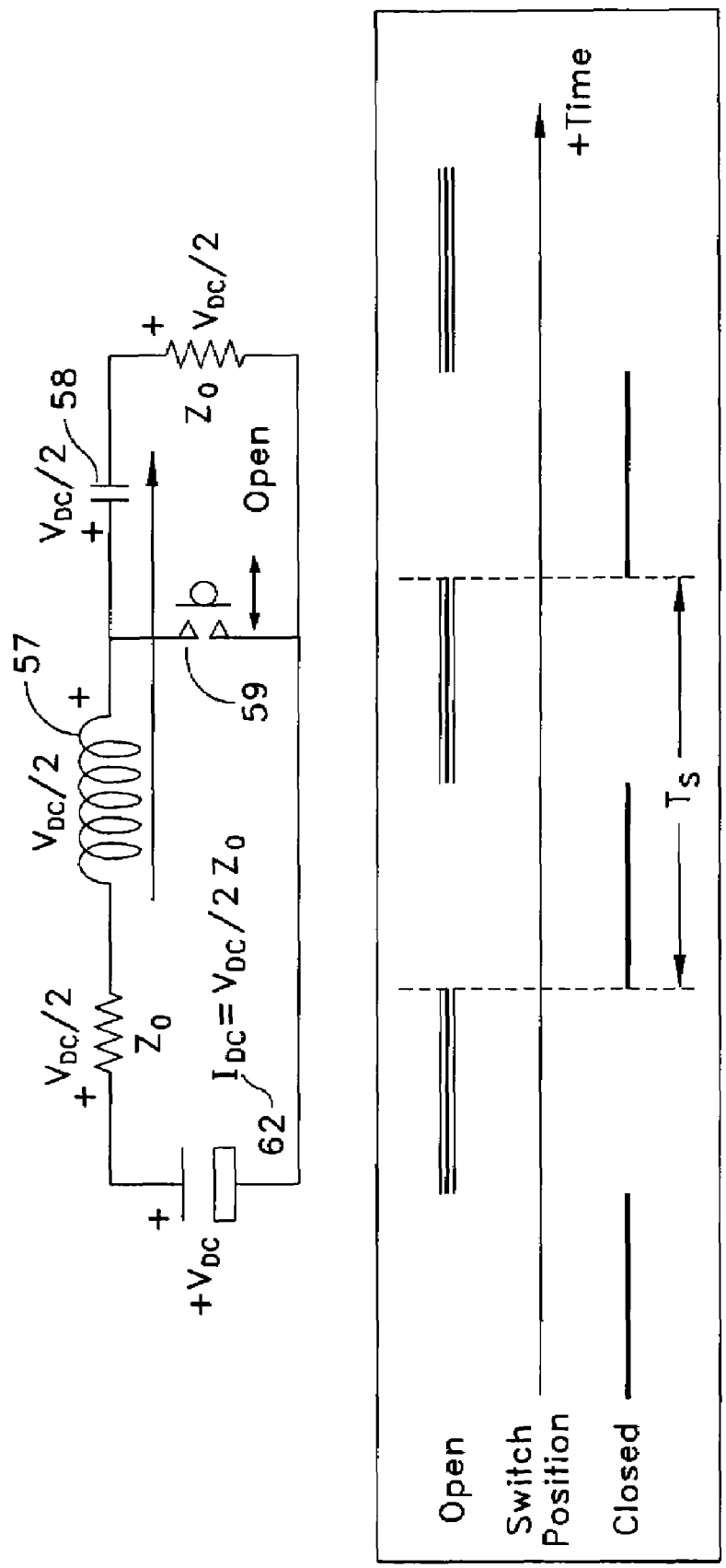
FIG. 6 depicts a square-wave generator, steady state, OPEN switch.

An OPEN condition of the steady-state switch 59 is illustrated in FIG. 6. During the depicted half period, the switch 59 is OPEN so that the current through the switch branch is zero.

A steady-state DC current 62 equal to $V_{DC}/2Z_0$ passes through the load, $Z_0$, producing a voltage, $V_{DC}/2$. During this half period $T_S/2$, energy is supplied to the circuit by the decay of flux linkages in the inductor 57 while additional energy is being stored by increasing the charge held by the capacitor 58. The voltage across the OPEN switch 59 is $V_{DC}$. The average, steady-state, energy stored on the inductor 57 is $E_{AVG} = \{L(V_{DC})^2\}/8 (Z_0)^2$ in which "L" is the inductance of the inductor. The energy delivered to the circuit, $E_{DEL}$, by the inductor 57 during each OPEN-SWITCH condition should be a small fraction of the average energy, $E_{AVG}$. This will be true if the inductance is much greater than the product, $Z_0 T_S$. Thus, it is required that $L >> Z_0 T_S$. During the OPEN condition of the switch 59, the voltage across the branch of the switch is $V_{DC}$.

Figure 7:
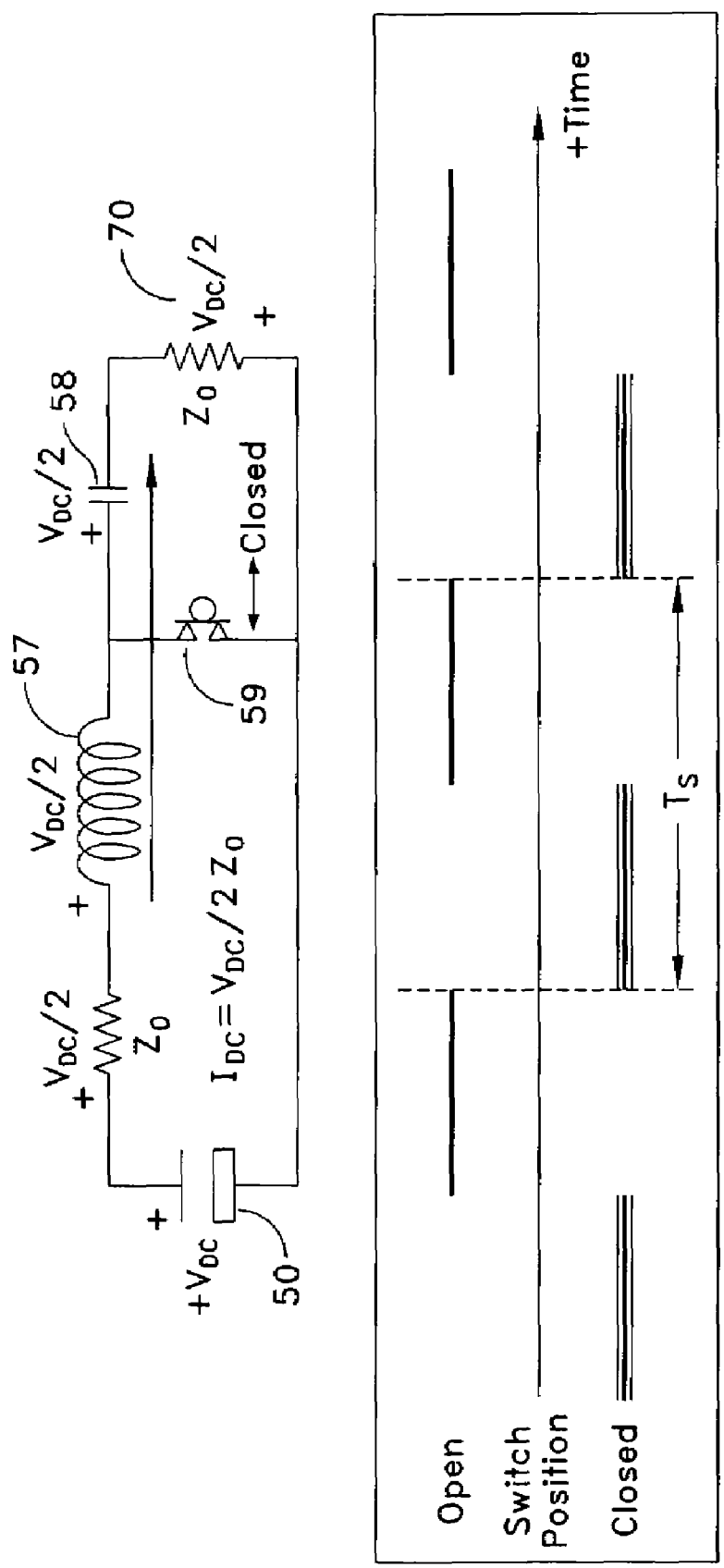
FIG. 7 depicts a square-wave generator, steady state, CLOSED switch.

A steady state CLOSED condition of the switch 59 is illustrated in FIG. 7. During the depicted half period, the switch 59 is CLOSED so that the voltage across the switch branch is zero. A steady state DC current, $I_{DC}$, equal to $V_{DC}/2Z_0$ reverses through the load, $Z_0$, producing a voltage, $-V_{DC}/2$. During this half period, $T_S/2$, energy is supplied to the circuit by the capacitor 58 while new energy from the source is being stored in the inductor 57. The current through the CLOSED switch 59 is $V_{DC}/Z_0$, which is twice the steady state DC current supplied by the DC source 50. The average, steady state, energy stored on the capacitor 58 is $E_{AVG} = C(V_{DC})^2/8$ in which "C" is the capacitance of the capacitor. The energy delivered to the circuit by the capacitor 58 during each CLOSED condition half period is $E_{DEL} = T_S(V_{DC})^2/8Z_0$, which is the same as that delivered by the inductor 57 during each OPEN condition half period. The choice of value of the capacitor 58 is made by observing that the delivered energy, $E_{DEL}$, should be a small fraction of the average energy, $E_{AVG}$. This will be true if the capacitance is much greater than the ratio $T_S/Z_0$. Thus, $C >> T_S/Z_0$ is required. During the CLOSED condition of the switch 59, the current through the branch of the switch is $V_{DC}/Z_0$, which is twice the current from the DC source 50.

Energy balance is achieved if the ratio of the element values, L and C, are chosen such that $(L/C) = (Z_0)^2$. The average energy stored on each element is the same. The energy exchange during each period of steady state operation is illustrated in FIG. 8.

Figure 8:
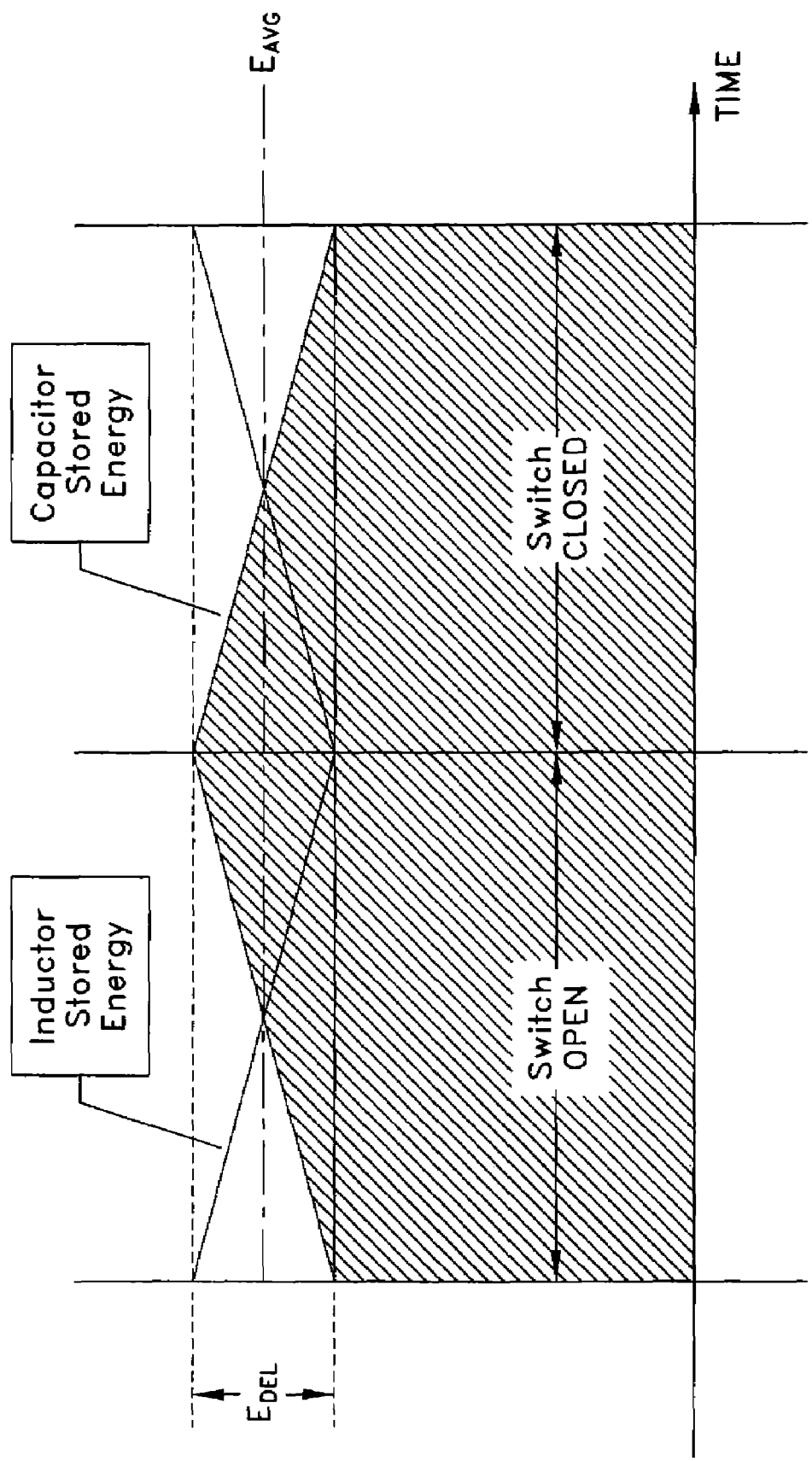
FIG. 8 depicts a square-wave generator, steady state energy exchange.

FIG. 8 depicts the time variation of the energy stored on the inductor 57 and capacitor 58 in the square-wave generator illustrated in FIG. 5, FIG. 6 and FIG. 7. During each half period, energy is delivered to the circuit by either the inductor 57 or the capacitor 58 while the energy stored on the other component is increasing. During the next half period, the process reverses. The figure is based on an assumed condition that $E_{DEL} << E_{AVG}$. Only one period is illustrated because, in the steady state, each period is identical to every other period.

By comparing FIG. 6 with FIG. 7, the effects caused by the switch CLOSING operation are shown. When the switch 59 closes, the voltage across the inductor 57 changes polarity, but not magnitude, while the current through the capacitor 58 and a load impedance 70 changes direction, but not magnitude. Both of these instantaneous changes are permissible by the boundary conditions imposed by the circuit components and no transient behavior occurs as a result of the CLOSING operation of the switch 59. The current through the inductor 57 and the voltage across the capacitor 58 do not change when the switch 59 CLOSES and this is also required by the respective boundary conditions of the inductor and the capacitor.

In one embodiment, the switch 59 used to implement the square-wave generator circuit could be a transistor collector emitter circuit. A small amount of energy is necessary to power a switch driver to provide the base-emitter drive current, which can be more than hundred times less than the peak collector-emitter current, $V_{DC}/Z_0$, when the switch is CLOSED.

Energy Efficient [Square-Wave]-to-DC Converter

Figure 9:
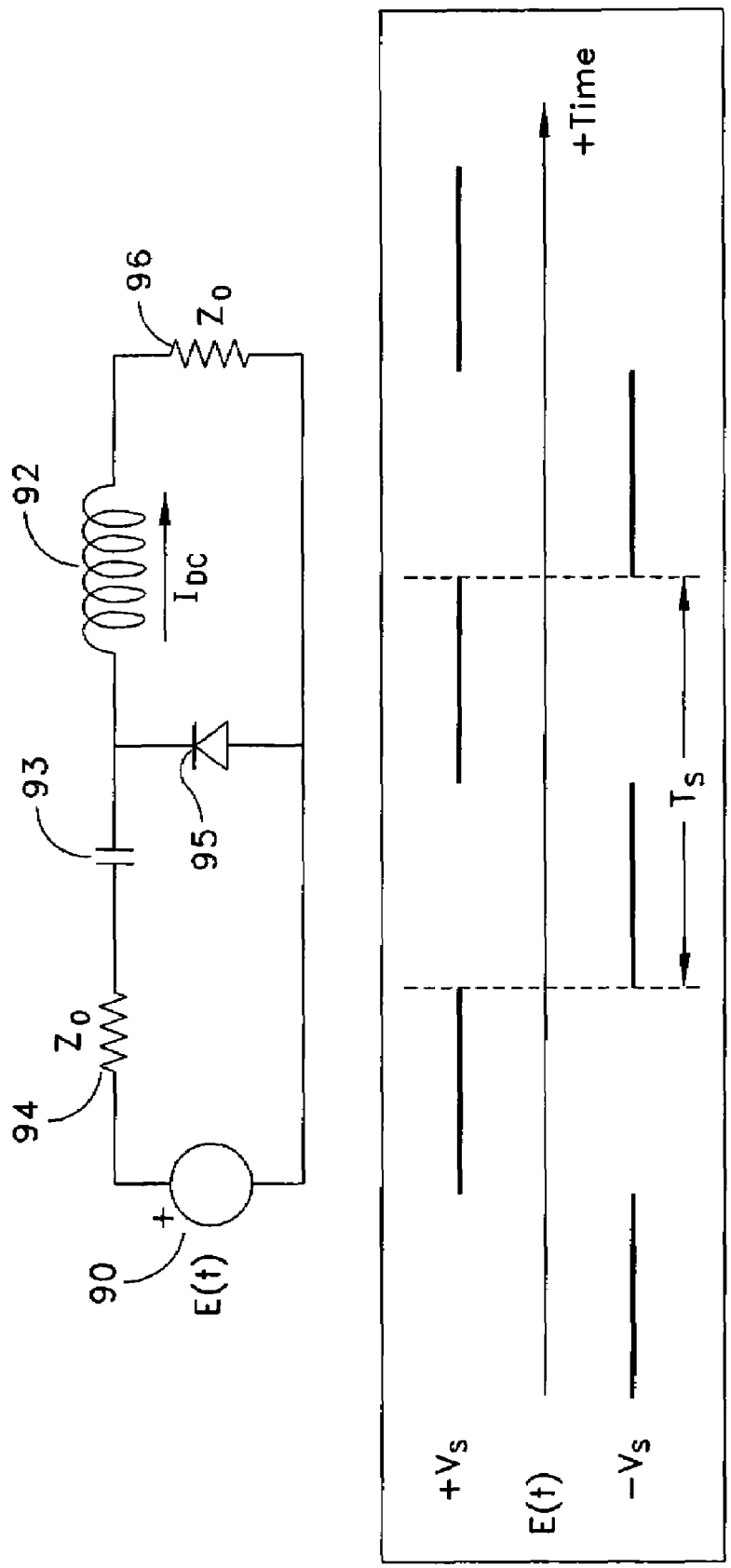
FIG. 9 depicts a [square-wave]-to-DC converter circuit.

In FIG. 9, an energy efficient [square-wave]-to-DC converter circuit is illustrated. The passive circuit requires a capacitor and an inductor for energy exchange and a single diode. A square-wave source 90 switches periodically between a positive voltage, $+V_S$ and a negative voltage, $-V_S$. After a steady state condition is reached, an inductor 92 acts as a constant current source delivering a positive DC current to the load resistor, $Z_0$.

A transient state occurs when the square-wave source 90 is first initialized. The transient state lasts until the voltage across a capacitor 93 and the current through the inductor 92 each reach a steady-state condition. The square-wave source 90 and a source impedance 94 represent the Thevenin-Equivalent of a transmission line being driven by a square-wave generator. If the inductor 92, the capacitor 93, and a diode 95 of the converter circuit are assumed to be ideal, then the efficiency of the converter circuit is one hundred percent. That is, the DC power delivered to a load resistor 96 is equal to the maximum power available from a Thevenin-equivalent generator.

The square-wave is converted to DC by a non-linear property of the diode 95 that, in one state, permits an undefined current to flow through a branch of the diode in only one direction while the voltage across the branch containing the diode is zero and that, in a second state, permits an undefined voltage across the branch of the diode in only one polarity while the current through the branch of the diode is zero.

The operation of the converter circuit in steady state is described by observing each non-linear state separately. When the diode polarity is as illustrated in FIG. 9, the two states correspond to the NEGATIVE half period of the square-wave and to the POSITIVE half period of the square-wave, respectively.

Figure 10:
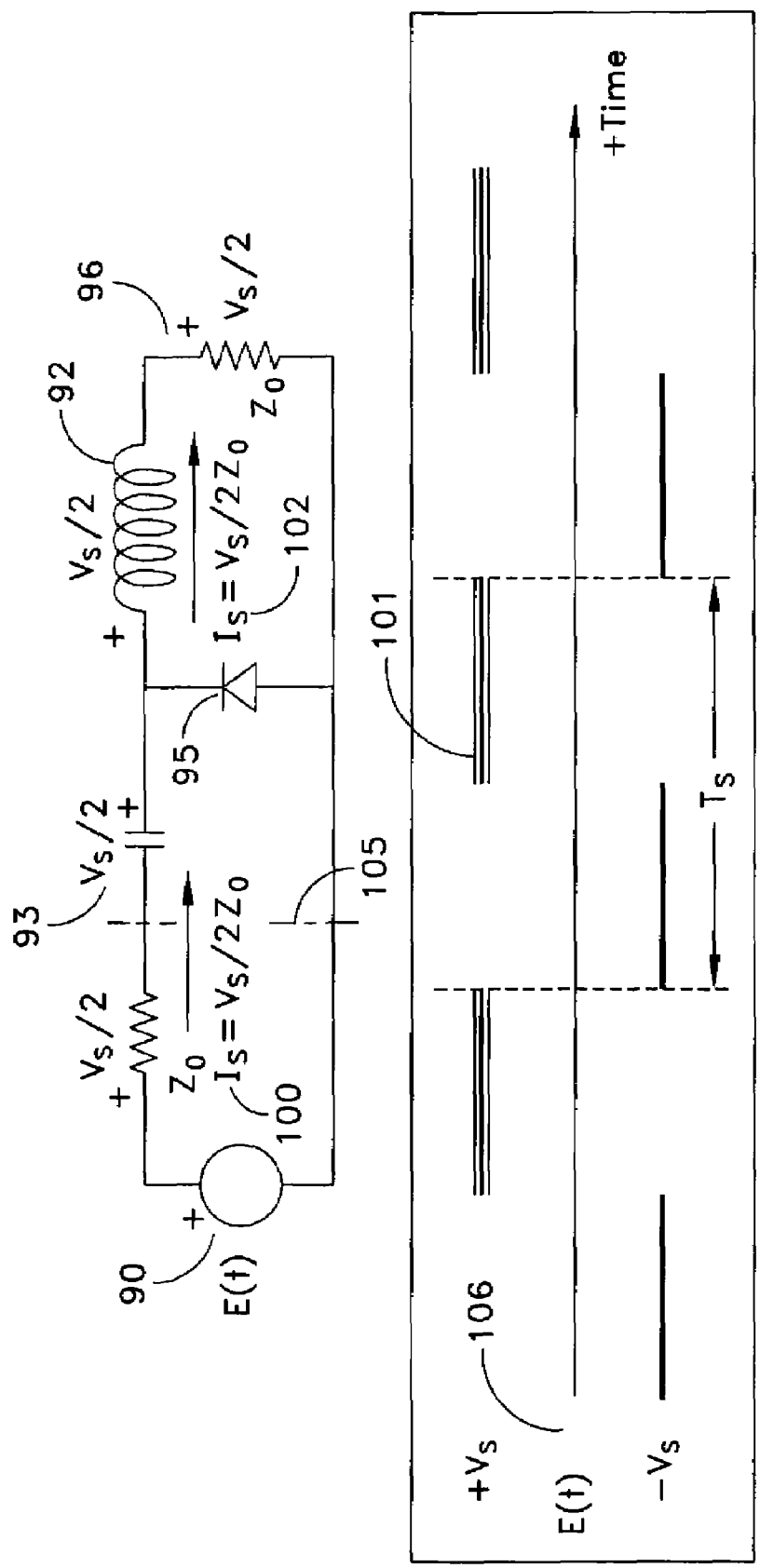
FIG. 10 depicts a [square-wave]-to-DC converter, positive half period.

The converter circuit steady-state operation during the POSITIVE half period is illustrated in FIG. 10. During the depicted half period, the square-wave source 90 (generator) presents a POSITIVE voltage, $V_s$, to the circuit causing a current, $V_s/2Z_0$, to flow in the circuit. The diode 95 is reverse-biased by a voltage equal to $V_s$ so that no current flows in the branch containing the diode. Thus, the current $I_s$ flows through the load $Z_0$, thereby generating a voltage $V_s/2$ across the load. During this half period, the capacitor 93 supplies energy to the circuit while the inductor 92 is storing energy. The current through a branch of the diode 95 is zero.

The current driven by the square-wave source 90 flows through the capacitor 93, the inductor 92, and the load resistor 96. During this half period, energy is delivered to the circuit by the capacitor 93 while the stored energy of the inductor 92 is increasing. The average, steady state, energy stored on the capacitor 93 is $E_{AVG} = C(V_S)^2/8$ in which "C" is the capacitance of the capacitor. The energy delivered to the circuit by the capacitor 93 during each positive half period is $E_{DEL} = T_S(V_S)^2/8Z_0$. The choice of value of the capacitor 93 is made by observing that the delivered energy, $E_{DEL}$, should be a fraction of the average energy, $E_{AVG}$. This will be true if the capacitance is much greater than the ratio, $T_S/Z_0$. Thus, it is required that $C >> T_S/Z_0$. During the POSITIVE half periods of the square-wave, the voltage across the branch of the diode 95 is $V_S$ with a polarity that reverse-biases the diode junction so that no current can flow in the branch containing the diode.

Figure 11:
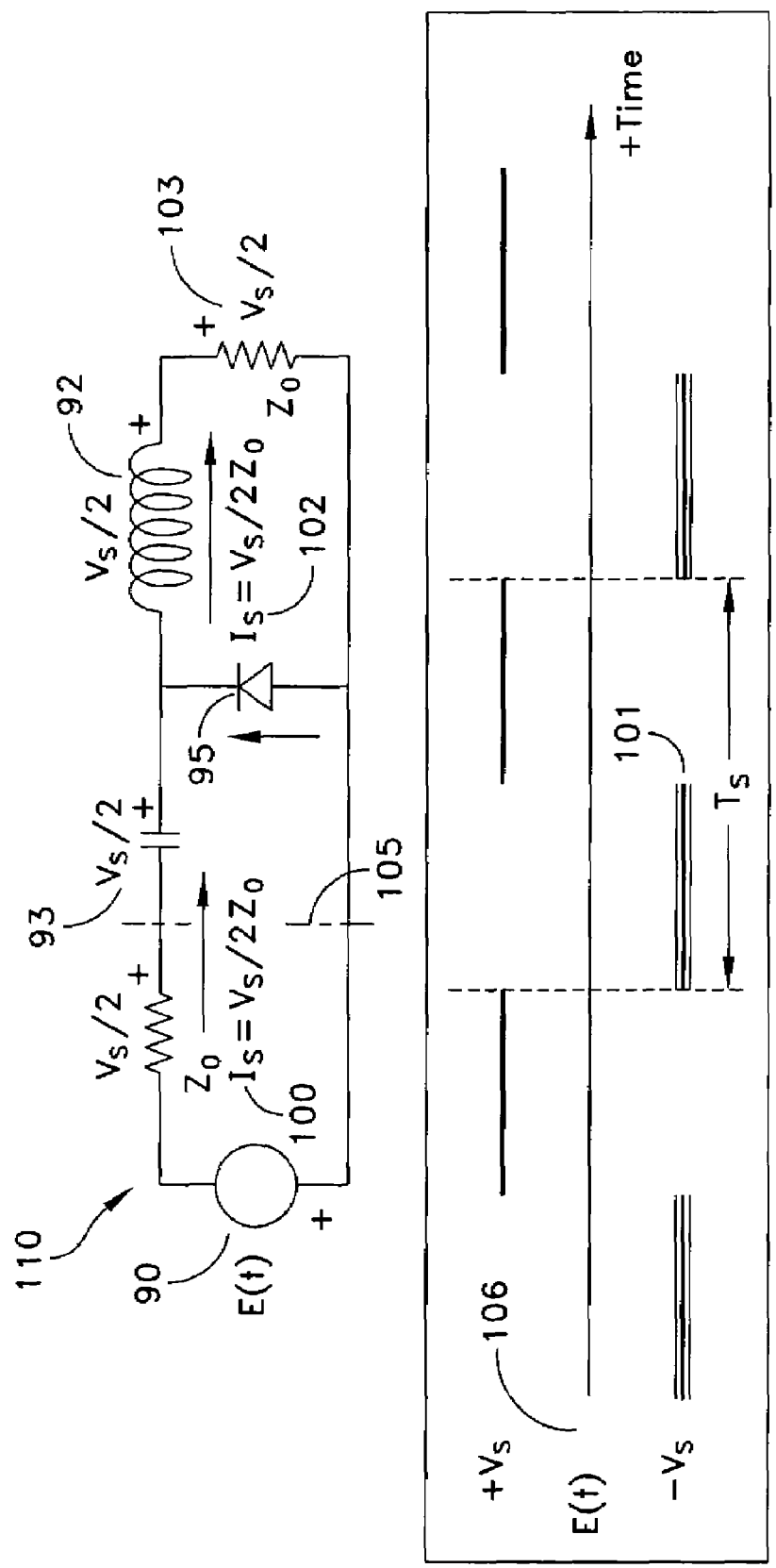
FIG. 11 depicts a [square-wave]-to-DC converter, negative half period.

The converter circuit steady state operation during a NEGATIVE half period is illustrated in FIG. 11. During this half period, the square wave source 90 presents a negative voltage-$V_s$ to the circuit causing a current $-V_s/2Z_0$ to flow in the circuit. The diode 95 is forward-biased by a current equal to $V_s/Z_0$ and the voltage across the branch containing the diode is about zero. A current $I_S$ flows through the load $Z_0$, generating a voltage $V_s/2$ across the load. During the depicted half period, the capacitor 93 is storing energy while the inductor 92 supplies energy to the circuit.

The voltage across the branch of the diode 95 is zero and the current through a branch of the diode is $V_S/Z_0$, which is twice a current 100 driven by the square-wave source 90. During this half period, $T_S/2$, energy is delivered to the circuit by the inductor 92 while stored energy of the capacitor 92 is increasing. An average, steady state, energy stored on the inductor 92 is $E_{AVG} = \{L(V_S)^2\}/8(Z_0)^2$ in which "L" is the inductance of the inductor. The energy delivered to the circuit by the inductor 92 during each NEGATIVE half period is $E_{DEL} = T_S(V_S)^2/8Z_0$. The choice of value of the inductor 92 is made by observing that the delivered energy, $E_{DEL}$, should be a small fraction of the average energy, $E_{AVG}$. This will be true if the inductance is much greater than the product $Z_0 T_S$. Thus, it is required that $L >> Z_0 T_S$.

Energy balance is achieved if the ratio of the element values, L and C, are chosen such that $(L/C) = (Z_0)^2$. Then, the average energy stored on each element is the same. The energy exchange during each period of steady state operation is illustrated in FIG. 12.

Figure 12:
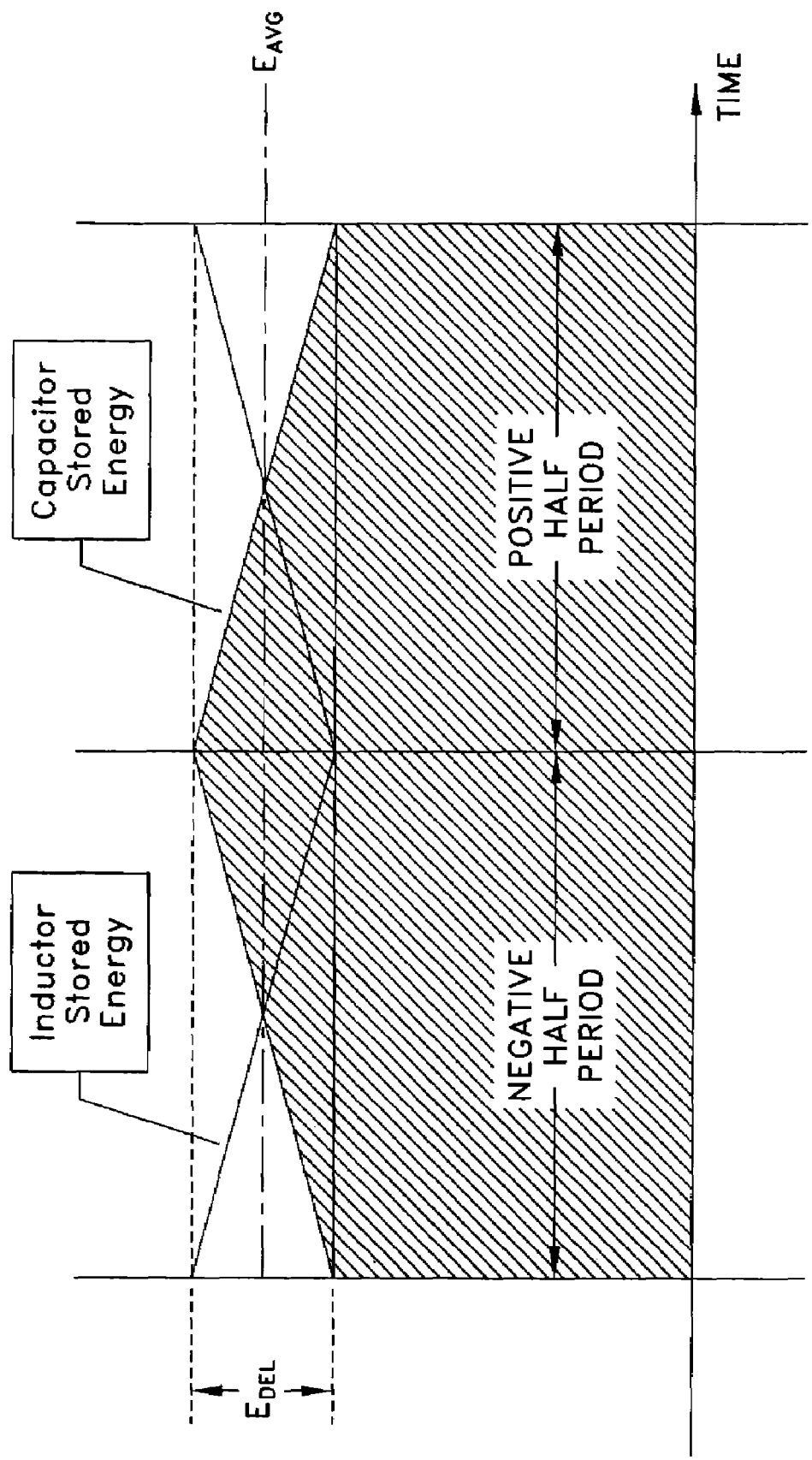
FIG. 12 depicts a DC converter, steady state energy exchange.

FIG. 12 depicts the time variation of the energy stored on the inductor and capacitor in the DC converter illustrated in FIG. 9, FIG. 10 and FIG. 11. During each half period, energy is delivered to the circuit by either the inductor or the capacitor while the energy stored on the other component is increasing. During the next half period, the process reverses. FIG. 12 is based on an assumed condition that $E_{DEL} << E_{AVG}$. Only one period is illustrated because, in the steady state, each period is identical to every other period.

By comparing FIG. 10 with FIG. 11, the effects caused by the instantaneous change in square-wave polarity from POSITIVE to NEGATIVE are shown. When a square-wave polarity 101 changes, the voltage across the inductor 92 also changes polarity, but not magnitude, while a current 102 through the capacitor 94 changes direction, but not magnitude. Both of these changes are permissible by the boundary conditions imposed by the circuit components and no transient behavior occurs as a result of the polarity change. The current through the inductor 92 and the voltage across the capacitor 93 does not change when the square-wave polarity changes. The current through the square-wave source 90 and a load 103 is the same as the current through the inductor 92 and does not change in either polarity or magnitude. Thus and as predicted, the load resistor 96 experiences direct current (DC).

By comparing FIG. 10 with FIG. 3 and FIG. 11 with FIG. 4, the converter circuit is indistinguishable from a resistive termination, $Z_0$, when the source voltage is a square wave.

Consider a boundary 105 shown in FIG. 10 and a boundary 39 shown in FIG. 3. The square-wave source 90 (generator) to the left of the boundary 105 in FIG. 10 is identical to the generator 32 to the left of the boundary 39 in FIG. 3.

The current 100 crossing the boundary 105, from the square-wave source 90 to the converter circuit is identical to the current 34 crossing the boundary 39 from the generator to the matched termination, $Z_0$. The voltage across the boundary 105 is $V_S/2$, which is identical to the voltage across the boundary 39. Thus, it can be concluded that, during the POSITIVE half cycle of a square-wave 35 and a square-wave 106, the converter circuit is indistinguishable from a resistor having a value, $Z_0$.

Consider the boundary 105 shown in FIG. 11 and the boundary 39 shown in FIG. 4. The square-wave source 90 and a Thevenin-Equivalent circuit 110 to the left of the boundary 105 in FIG. 11 is identical to the current 34 and a Thevenin-equivalent circuit to the left of the boundary 39 in FIG. 4.

The current 102 of the capacitor 93 crossing the boundary 105, from the converter circuit to the Thevenin-Equivalent generator is identical to the current 34 crossing the boundary 39 from the matched termination, $Z_0$. The voltage across the boundary 105 is $V_S/2$, which is identical to the voltage across the boundary 39.

Thus, it can be concluded that, during the negative half cycle of the square-wave 35 and 101, the converter circuit is indistinguishable from a resistor having a value, $Z_0$.

After reaching a steady state condition, the disclosed converter circuit is indistinguishable from a resistive termination $Z_0$, when driven by a square-wave. This property allows the converter circuit to be used as a matched termination for a uniform transmission line of any length with a transmission line characteristic impedance equal to $Z_0$ when the uniform transmission line is driven by a square-wave source. This property is illustrated in FIG. 13.

Figure 13:
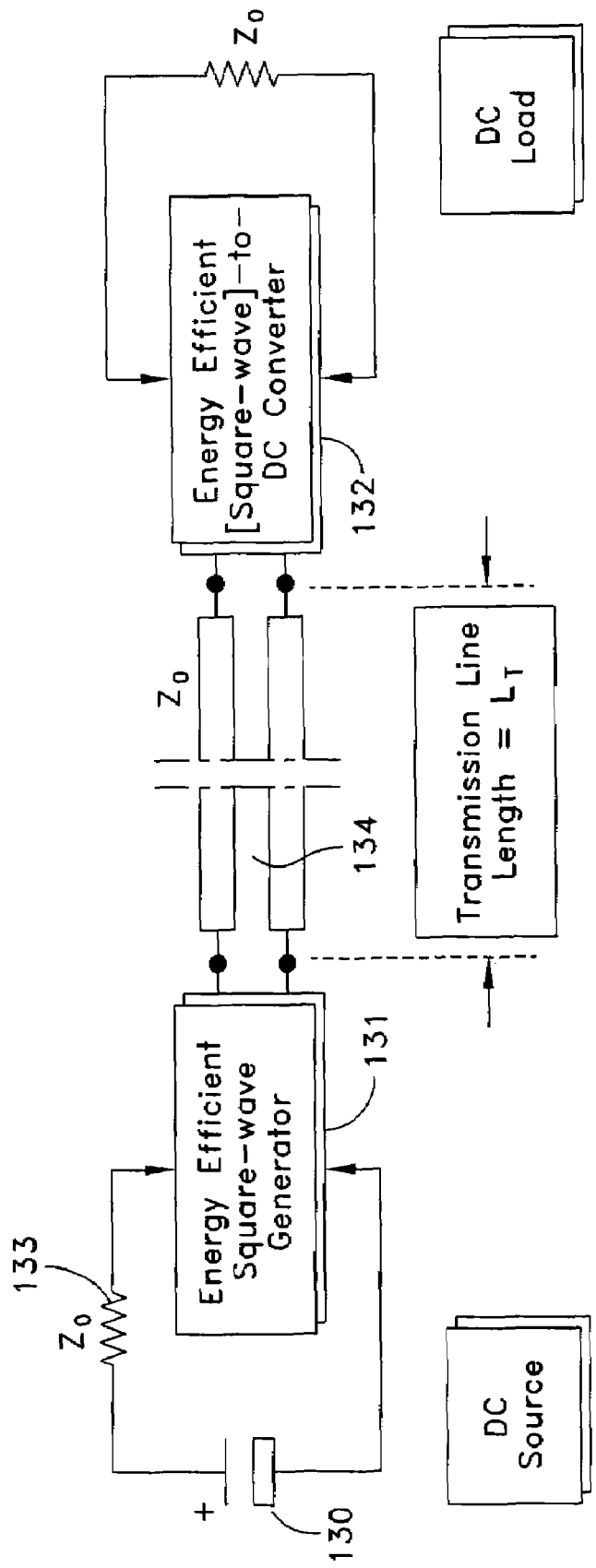
FIG. 13 depicts a power transmission model.

In FIG. 13, power from a DC source 130 is transmitted over a distance $L_T$ (transmission line length), using an energy efficient square-wave generator 131 and an energy efficient [square-wave]-to-DC converter 132. The source impedance 133 of the DC source, the characteristic impedance of transmission line 134 and the DC load impedance are each equal to $Z_0$.

The transmission line 134 can be comparatively long since the [square-wave]-to-DC converter 132 presents a matched termination to the transmission line. The matched termination ensures that there are no reflections or standing waves on the transmission line 134 that would corrupt the operation of the system.

Method for Coupling DC Power Across An Impermeable Non-Conducting Membrane

Figure 14:
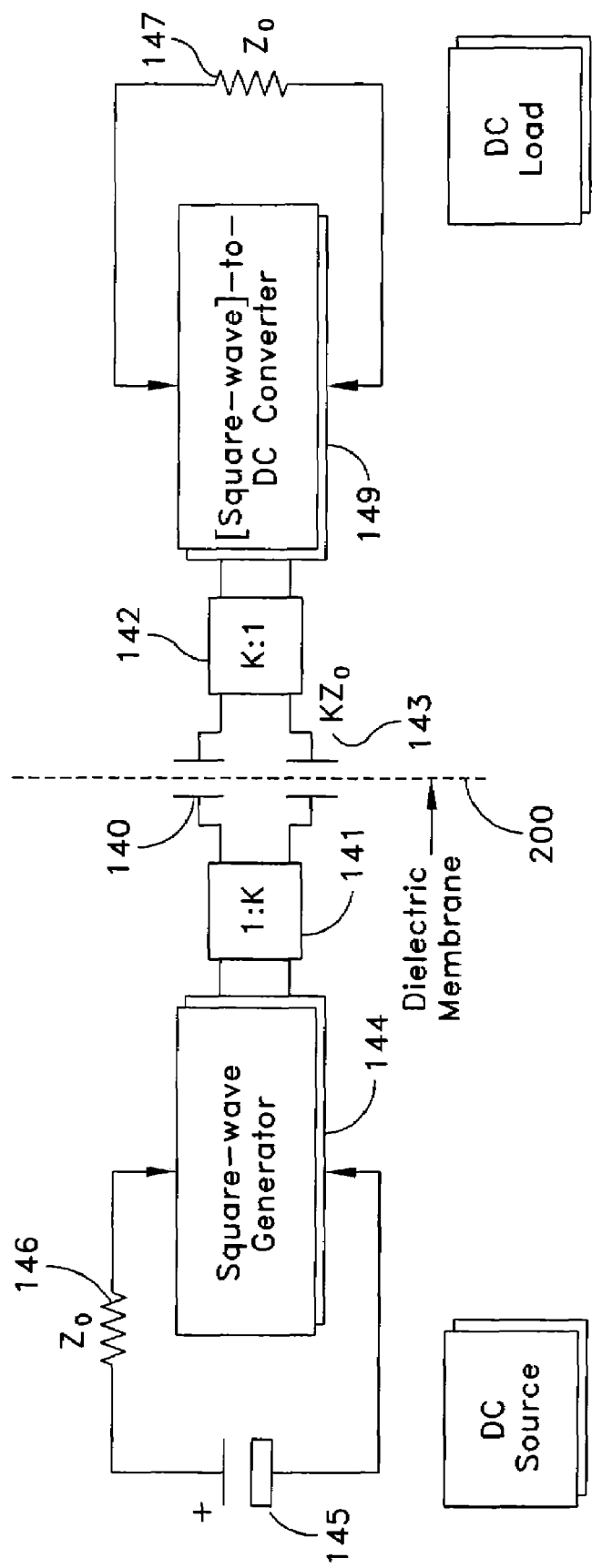
FIG. 14 depicts a schematic for coupling a DC source across a dielectric membrane.

In FIG. 14, power transmission through coupling capacitors 140 can provide power to electrical circuits inside a sealed environment. In the figure, broadband transmission line transformers 141 and 142 are used to step up the impedance level by a factor of "K" in the case of the capacitive coupling or step down by a factor of "p" in the case of an inductive coupling. Thus, the time constant of the coupling-capacitor circuit is increased by the factor K. A well-known property of transmission line transformers is that the factor K or the factor "p" can be any ratio of the form $(M^2/N^2)$ in which "M" and "N" are integers. In practice, impedance levels in broadband circuits can range between a low of about 6 Ohms and a high of about 600 Ohms. The largest practical value for $KZ_0$ is typically less than 600 Ohms.

A transmission line 143 that is coupled across a dielectric membrane using the two coupling capacitors 140 is illustrated. The wideband transmission line transformers 141 and 142 raise the impedance level at the dielectric boundary by the factor K in order to increase the transmission efficiency across the dielectric boundary. Wideband transmission-line transformers are extensively used in circuit applications covering a few MHz to a few GHz. Designs have been described and are known to those skilled in the art covering transformation ratios to approximately 64:1. In general, any impedance ratio of the form $(M^2/N^2)$, in which M and N are integers, can be realized using the wideband transmission line concepts.

In principal, the impedance level $KZ_0$ can be comparatively very large. However, practical circuit limitations will usually constrain $KZ_0$ to a maximum of about 600 Ohms. Assuming that the coupling capacitor 140 is 10 pico-Farad (pF), the period $T_S$ of a square-wave generator 144 will be constrained by $T_S<2RC$, or $T_S<2[(600)\times(10^{-11})]$, or $T_S<12$ nano-seconds. Thus, the frequency of the square-wave would be about 50 MHz, which is within the practical limitations of the disclosed method.

The square-wave generator 144 converts a DC source 145 with an internal impedance, $Z_0$ (load resistor 146) to a zero average value square-wave source at an impedance level, $Z_0$ (load resistor 147). The output of the square-wave generator 144 drives the wideband transmission-line transformer that raises the impedance level of the square-wave source to $KZ_0$. The output of the transmission line transformer 141 is capacitor-coupled across a dielectric membrane 200 (or other impermeable membrane) to the second transmission line transformer 142 that reduces the impedance level of the square-wave to $Z_0$. The output of the second transmission-line transformer 141 feeds a converter 149 that converts the square-wave to a direct current, which feeds the load resistor 147 with an impedance, $Z_0$.

In a variant of the method of the present application, a dual coupling mode may be accomplished. The method will be recognizable to those ordinarily skilled in the art by recognizing that the method of the present application can also be realized by a dual method wherein a magnetic coupling mechanism is effected by placing coupled coils 300 and 310 on topologically opposite sides of a non-magnetic membrane 400.

Figure 15:
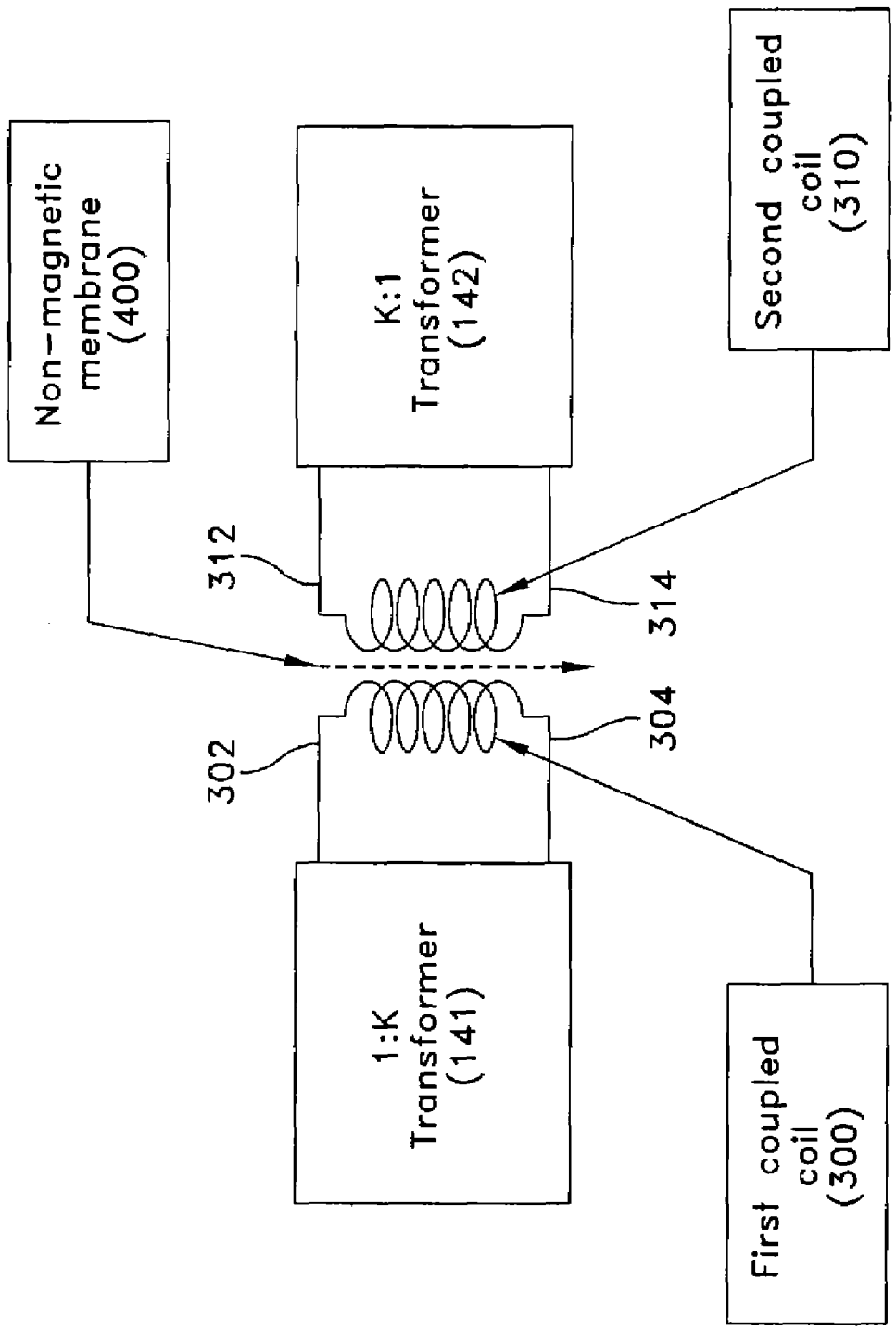
FIG. 15 depicts a first variant of coupling a DC source across a membrane.

While this application focused on capacitive coupling in order to teach the method, the dual magnetically coupled mode is claimed implicitly and supported by FIG. 15. In the former case, the coupling takes place at a high impedance level by means of coupling capacitors, whereas, in the dual case, the coupling takes place at a low impedance level by the coupled coils 300 and 310 on opposite sides of the non-magnetic membrane 400. In the capacitor coupling case, the transformer impedance ration is labeled "K" whereas in the dual inductive coupling case, the transformer ratio is labeled "p" in order to differentiate the two impedance ratios.

In the dual case of the non-magnetic membrane 400, the transformer 141 is designed to convert the source impedance to a low value (6 Ohms for example) because the magnetic coupling depends on current (Ampere turns). One coil 300 is placed on the DC source side while a second coupled coil 310 is placed on the load side. The non-magnetic membrane 400 topologically separates the two coils 300, 310 so that the spatial integrity of the load container can be maintained. The two-terminal outputs of the transformer 141 are electrically connected to two terminals 302, 304 of the first coupled coil 300 and two-terminal outputs 312, 314 of the second coupled coil 310 are electrically connected to the terminal output of the second transformer 142.

A non-magnetic membrane may be necessary in some applications in order to provide an electric-field shield for an electronic system. One example of a non-magnetic membrane is aluminum foil.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for coupling a direct current power source through a non-conducting membrane, said method comprising the steps of:
   providing the direct current power source with source impedance $Z_0$;
   providing, in series with the power source, a switching circuit containing a periodically time varying switch wherein the time varying switch is capable of converting voltage of the power source into a square-wave voltage across a load resistance equal to $Z_0$;
   providing, in series with the switching circuit, a first transmission line with characteristic impedance, $Z_0$;
   providing a first transformer with an effective turns ratio 1: N and with the 1-turns side electrically connected to the output of the first transmission line;
   providing two capacitor plates on a first side of the membrane and electrically connected to two terminals of the N-turns winding of the first transformer;
   providing two capacitor plates on a second side of a membrane and located in proximity to the two capacitor plates on the first side of the membrane;
   providing a second transformer with turns ratio N:1 with two terminals of the N-turns winding electrically connected to the two capacitor plates on the second side of the membrane;
   providing a second transmission line with characteristic impedance, $Z_0$, connected to the two terminals of the 1-turns winding of the second transformer;
   providing a non-linear circuit containing at least one diode that converts a square-wave to a direct current, constant voltage across a load resistor $Z_0$;
   operating the switching circuit such that a square wave is generated in the first transmission line and such that the square wave amplitude is proportional to the magnitude of the voltage of the DC source, which is connected to the switching circuit;
   achieving a steady-state condition of the voltage and the current within the first transmission line by said square-wave generating step;
   changing a source impedance level of the square-wave with the first transformer by a factor of $N^2$;
   outputting the square-wave from the first transformer to the first-side plates of a capacitor pair;
   transmitting the square-wave from the first-side transformer N-turns winding to the second-side transformer N-turns winding by means of the two coupling capacitors formed by two plates on each of the sides of a membrane;
   transmitting the square-wave by the second transmission line to the non-linear circuit; and
   converting the square-wave by the non-linear circuit to a direct current source of power delivered to a load resistance, $Z_0$.

2. The method in accordance with claim 1 wherein the impedance level is in the range between 6-600 Ohms.

3. The method in accordance with claim 2 wherein a frequency of the square-wave is 50 MHz.

4. A system for coupling a direct current power source through a dielectric membrane, said system comprising:
   a first electrical transmission line;
   a generator including a controlling switch, said generator electrically in series with the power source within the first transmission line;

a first transformer electrically in series with said generator;

a first set of plates on a side of the membrane to form a first capacitor, said first capacitor electrically in series with said first transformer;

a second set of plates on an opposite side of the dielectric membrane to form a second capacitor;

a second electrical transmission line;

a second transformer electrically in series with said second capacitor in said second transmission line; and a converter electrically connected to and capable of receiving output of said second transformer;

wherein said generator is capable of generating a square wave frequency of voltage and current with the DC power by periodic operation of said switch such that the time period of the periodic operation is fixed that when said switch is in an open position, a current thru said switch has zero value while a voltage has a positive value and that when said switch is in a closed position the current thru said switch has a positive value while the voltage has a zero value;

wherein said first transformer is capable of raising an impedance level of the square-wave to a factor to be captured by said first capacitor;

wherein said second transformer is capable of stepping down the impedance level of the square-wave from said second capacitor; and wherein said converter terminates at an impedance level matching the termination of said generator such that said converter is capable of converting the square wave to a direct current for use on the opposite side of the membrane.

5. The system of claim 4 said system further comprising a load resistor electrically connected to said converter, said load resister capable of receiving the direct current from the converter for use with a load.

6. The system in accordance with claim 5 wherein capacitance of said first capacitor is determined by a choice of value observed by a delivered energy as a fraction of average energy of said system.

7. The system in accordance with claim 6 wherein said switch is a transistor collector-emitter circuit.

8. The system in accordance with claim 7 wherein said first capacitor and said second capacitor are circular plates.

9. A method for coupling a direct current power source through a non-magnetic membrane, said method comprising the steps of:

providing the direct current power source with source impedance $Z_O$;

providing, in series with the power source, a switching circuit containing a periodically time varying switch wherein the switch is capable of converting voltage of the power source into a square-wave voltage across a load resistance equal to $Z_O$;

providing, in series with the switching circuit, a first transmission line with characteristic impedance, $Z_O$;

providing a first transformer with an effective turns ratio 1:p and with the 1-turns side electrically connected to the output of the first transmission line;

providing a first magnetically coupled winding on the first side of the non-magnetic membrane and electrically connected to two terminals of the p-turns winding of the first transformer to form a first side of a magnetic coupling coil pair;

providing a second magnetically coupled winding on the second side of a non-magnetic membrane and located such that the first magnetically coupled winding and the second magnetically coupled winding are magnetically coupled but topologically isolated by a non-magnetic membrane;

providing a second transformer with turns ratio p:1 with two terminals of the p-turns winding electrically connected to the two terminals of the second magnetically coupled winding on the second side of the non-magnetic membrane;

providing a second transmission line with characteristic impedance, $Z_O$, connected to the two terminals of the 1-turns winding of the second transformer;

providing a non-linear circuit containing at least one diode that converts the square-wave to a direct current, constant voltage across a load resistor $Z_O$;

operating the switching circuit such that the square wave is generated in the first transmission line and such that the square wave amplitude is proportional to the magnitude of the DC voltage source;

achieving a steady-state condition of the voltage and the current within the first transmission line by said square wave generating step;

changing the source impedance level of the square-wave with the first transformer by a factor of $p^2$;

outputting the square-wave from the first transformer to the first-side winding of the pair of coupled coils;

transmitting the square-wave from the first-side transformer p-turns winding to the second-side transformer p-turns winding by means of the coupled coils on opposite sides of the non-magnetic membrane;

transmitting the square-wave by the second transmission line connected to the 1-turns winding of the second transformer to the non-linear circuit; and converting the square-wave to a direct current source of power delivered to a load resistance, $Z_O$.

* * * * *